April 26, 1966   W. H. HARRIS, JR   3,248,189
ABRADING TOOL STRUCTURE
Filed Jan. 2, 1962   2 Sheets-Sheet 1

SHOT BLAST

PRE-HEAT

SPRAY BONDING METAL

SPRAY PARTICLES

SPRAY BONDING MATRIX

HEAT

INVENTOR.
WILLIAM H. HARRIS JR.
BY
Barnes, Kisselle, Raisch
& Choate
ATTORNEYS

April 26, 1966  W. H. HARRIS, JR  3,248,189
ABRADING TOOL STRUCTURE
Filed Jan. 2, 1962  2 Sheets-Sheet 2
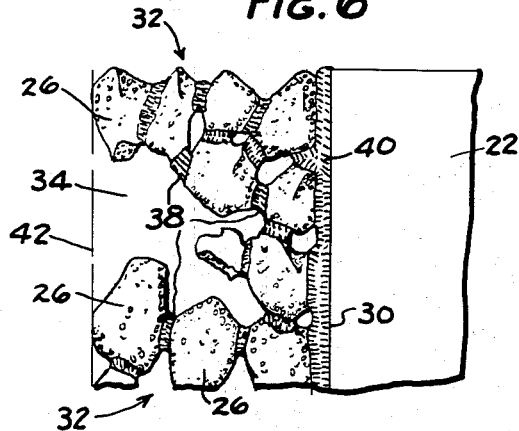
FIG. 6
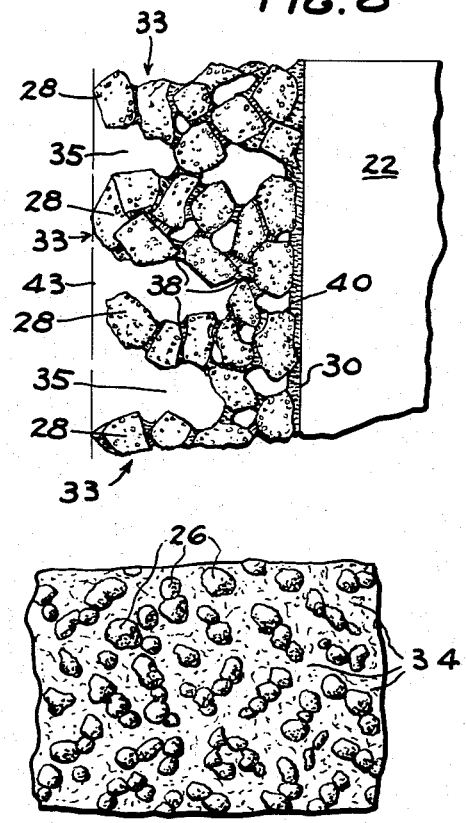
FIG. 8
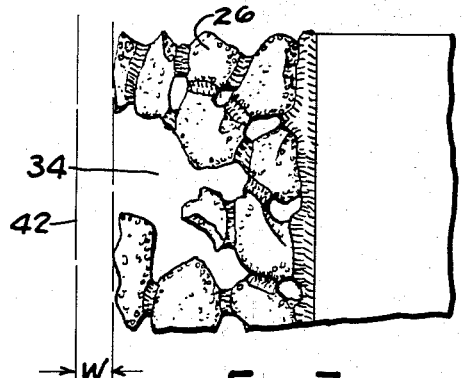
FIG. 7
FIG. 9
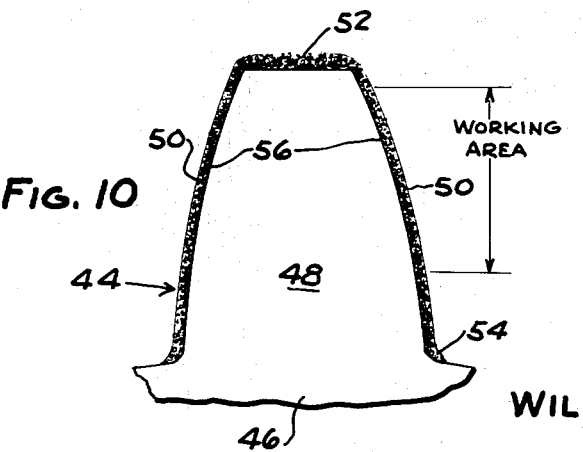
FIG. 10
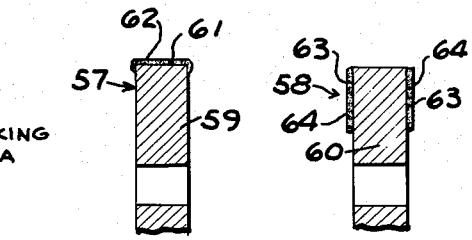
FIG. 11  FIG. 12
INVENTOR.
WILLIAM H. HARRIS JR.
BY
Barnes, Kisselle, Raisch
& Choate
ATTORNEYS

United States Patent Office 3,248,189
Patented Apr. 26, 1966

3,248,189
ABRADING TOOL STRUCTURE
William H. Harris, Jr., Detroit, Mich., assignor, by mesne assignments, to Dexco Corporation, Detroit, Mich., a corporation of Michigan
Filed Jan. 2, 1962, Ser. No. 163,417
4 Claims. (Cl. 51—295)

Conventional hones, as well as coarser types of grinding stones, comprise a large number of small grits of silicon carbide, aluminum oxide, or the like bonded together in a matrix of glass-like material. During the course of their manufacture, the hones must be heated over a long period of time to cure or harden the matrix. During the heating there are numerous factors which must be very carefully controlled in order to obtain any degree of uniformity in the characteristics of the hones produced. The process of making conventional hones is thus relatively slow and expensive.

Moreover, even under the best controlled heating conditions, the hones in a single batch frequently vary materially from each other, particularly as to hardness. This causes considerable difficulty where the hones are used in an automated production line, for example, in the honing of cylinders in automobile engine blocks. Numerous honing stones are usually used in such a line. Frequently the hones are of unequal hardness and wear at unpredictable, non-uniform rates. In other cases, a hone will be so hard that it will not wear fast enough but will tend to become loaded with the metal removed from the workpiece. These conditions often require an untimely stoppage of an entire automated production line to permit one or more honing stones to be changed. At best, the life expectancy of a conventional honing stone leaves much to be desired.

The accepted theory of hone functioning is that the hone must be made so that it will gradually crumble or disintegrate during use to release the metal removed from the workpiece and permit its removal from the working area of the stone. If a stone is too hard or doesn't disintegrate, its outer pores load up with the metal removed from the workpiece and the honing action is destroyed. The "wear" of a conventional hone is actually this gradual disintegration into abrasive particles. These particles often become imbedded in the workpiece in sufficient quantity to cause significant abrasive action on parts of a mechanism which have moving contact with the honed part.

An object of this invention is to provide a simple, relatively inexpensive hone structure which will last longer in use than conventional hones, which will wear uniformly at a predictable rate, which has the property of wearing down as distinguished from disintegrating, and which, nevertheless, will not become loaded during use. Another object of the invention is to provide a simple, inexpensive, rapid method of making such hones.

The invention contemplates a honing surface comprised of a large number of very small piles or columns of abrasive grits anchored in spaced apart relation on a substrate. The grits in each column are anchored together by interfusion of a matrix material on the grits. The spaces between the columns are open so that, in general, the columns form individual cutters.

Generally, the method of making hones having this structure includes providing the substrate with a layer of bonding metal under such conditions that substantially no oxides or foreign matter exists between the substrate and layer of bonding metal. Myriad grits, together with a matrix material, are then flame sprayed onto the layer of bonding metal. However, the volume of matrix used is small as compared to the volume of grits; and where the matrix is in the form of particles separate from the grits, the particles have a maximum size which, in general, is no greater than the size of the grits being used. Under these general conditions, when the grits and matrix are introduced into the hot gases, they become deposited on the substrate in the columnar conformation described above and open spaces are left between the columns so that they can act individually as cutters.

In the drawings:

FIG. 6 is a greatly enlarged fragmentary partly diagrammatic elevational view of a hone according to this invention.

FIG. 7 is a view similar to FIG. 6 showing the hone of FIG. 6 in slightly worn condition.

FIG. 8 is a view similar to FIG. 6 but showing the use of smaller grits.

FIG. 9 is a greatly enlarged diagrammatic fragmentary top plan view of a hone according to this invention.

FIG. 10 is a fragmentary diagrammatic representation of a honing gear according to this invention.

FIG. 11 is a fragmentary diagrammatic view of a honing wheel according to this invention having a circumferential honing surface.

FIG. 12 is a fragmentary diagrammatic view of a honing wheel according to this invention having side face honing surfaces.

Figure 5:
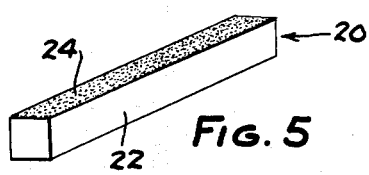
FIG. 5 is a partly diagrammatic perspective view of a honing stick made according to this invention.

Shown in FIG. 5 is a honing stick 20 according to the present invention. This honing stick is shaped and dimensioned so that it can be used in a conventional honing mechanism (not shown), for example, in the honing of cylinder bores. Honing stick 20 comprises a substantially rigid substrate 22 formed of steel or the like with a layer 24 of abrasive grits applied over one or more faces to provide the honing surface.

Figure 2:
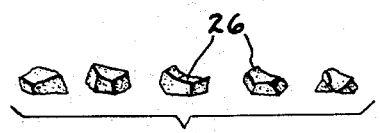
FIG. 2 is a diagrammatic elevational view of grits used in the manufacture of hones according to this invention.
Figure 3:
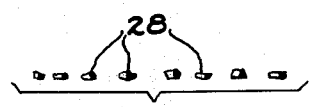
FIG. 3 is a view similar to FIG. 2 but showing grits of a smaller size.

The grits may have different sizes as illustrated at 26 in FIG. 2 and 28 in FIG. 3. The grits may be formed of any suitable abrasive material such as aluminum oxide, silicon carbide, tungsten carbide, titanium carbide, garnet, or the like. Tungsten carbide grits are selected for illustration of the invention.

The grits are adhered to surface 30 of substrate 22 in the form of piles or columns as represented at 32 and 33 respectively in FIGS. 6 and 8. These columns are spaced apart, and the spaces 34, 35 between the columns are open so that the top grit or grits on each column forms an individual cutter. The grits in each column are anchored to each other by a matrix material as represented at 38. The grits adjacent the base portion of each column are anchored to substrate surface 30 by means of a layer 40 of bonding material.

Matrix 38 comprises a material which will form a strong bond for anchoring the grits to each other and to layer 40. One suitable material is a nickel-chromium-boron alloy. Similarly, layer 40 may be formed of a nickel-chromium-boron alloy. These alloys may contain suitable quantities of other materials such as iron and silicon according to the specific characteristics required in a hone. Where the grits are of tungsten carbide, it has been found that inclusion of molybdenum and cobalt in these alloys improves the bond provided by matrix 38 between the grits and the bond between columns 32, 33 and layer 40.

In hones provided for ordinary commercial honing operations, columns 32 have a height of the order of about .015″ to .020″, and they cooperate to provide honing surface 24 lying generally in a plane 42, 43 as shown in FIGS. 6 and 8 respectively. In special precision hones, the columns could have a height as small as about .002″, and it is contemplated that in other special situations, the columns might have a height considerably greater than .020″.

FIG. 9 could be a plan view of either of the hones represented in FIGS. 6 and 8. Assuming that the hone of FIG. 6 is being viewed, the darker, more regularly defined shapes represent the tops of columns 26 while the lighter, intervening areas represent open spaces 34 between the columns. From this, it will be seen that the top portion of each column provides a tiny, individual cutting tool which is, in general, spaced from its neighbors. Honing surface 24 comprises a large number of these tools whose cutting edges have random orientation so that upon movement of the honing surface in any direction relative to a workpiece, the cutters will remove metal from the workpiece.

The edges of the cutting tools also have random rake angles and clearance angles, and this insures proper metal removal by the honing surface as a whole regardless of whether certain individual cutters are functioning as such at a given instant.

The cutters do not crumble or disintegrate in the course of use. Nevertheless, spaces 34, 35 do not load up with metal being removed from the workpiece. The reason for this is not thoroughly understood. It is theorized that the cutters remove the metal in chips so minute that insufficient heat is generated at any local area to cause any significant fusion of the chips; the chips are continually moved about by relative movement of the hone and workpiece, and the chips themselves provide an abrasive action which keeps spaces 34, 35 scrubbed out. Whether this is the correct explanation or not, however, the fact is that the hone does not become loaded during use.

During the course of use, the honing surface will be worn down, and this wear is represented at W in FIG. 7. As the honing cutters 26, 28 wear down, new cutting edges are continually formed; and these cutting edges, similar to their predecessors, have random orientation and random rake and clearance angles to insure continued proper honing.

Available evidence indicates that stick-type hones 20 according to this invention will have an average life of at least three to four times that of a conventional stick hone in commercial use. Hones according to this invention wear down at a uniform, predictable rate. The hones are inherently tough and non-brittle and are not subject to breakage under any conditions short of unusually violent treatment.

The honing device 44 shown in FIG. 10 is constructed similarly to honing stick 20 except that the substrate 46 is in the form of a gear and its teeth 48 are provided with a layer of grit columns providing honing surfaces 50. In a honing operation, the gear to be honed is rotated in dental engagement with gear 46, and honing surfaces 50 perform the honing action.

As is brought out in detail below, the grits are applied to the substrate by a spraying process. This results in a layer of grits which is thicker at the top of tooth 48 than at honing surfaces 50 and thinner adjacent the root of the tooth as shown respectively at 52 and 54. However, in the working areas along the sides of each tooth, the grit layer conforms accurately to the shape of tooth 48, and the layer thickness is substantially uniform. In actual use, a single honing gear has been used to hone in excess of 50,000 gears and with only three honed gears rejected as unsatisfactory. A conventional gear hone is considered to have an optimum capacity of honing about 5,000 gears with not more than about 2 to 3 percent (100 to 150 gears) rejected as unsatisfactory.

The honing devices 57 and 58 shown respectively in FIGS. 11 and 12 are constructed similarly to honing stick 20 except that the substrates 59, 60 are in the form of wheels. The layer of grit columns is provided around the circumferential surface 61 of wheel 59 to provide a cylindrical honing surface 62. The layer of grit columns is provided over one or more side surface portions 63 of substrate 60 to form planar honing surfaces 64.

In manufacture it is imperative that the surface of the substrate to be coated with the grits, that is, surface 30 of stick substrate 22, gear tooth surfaces 56, and honing wheel surfaces 61, 63 be prepared in such a way that the layer of bonding metal 40 will not dislodge from the substrate under relatively great forces acting in a shear direction at the interfacing portions of the bonding metal layer and substrate surface. In particular, it is important that no oxides or other foreign matter exist at surface 30, etc., and beneath layer 40. Oxidized areas on surface 30 would form centers for the growth of further oxides which would ultimately loosen layer 40 so that it would strip off. Other foreign matter on surface 30 would interfere with proper formation of a bond between layer 40 and surface 30 so that the layer would strip off.

Figure 1:
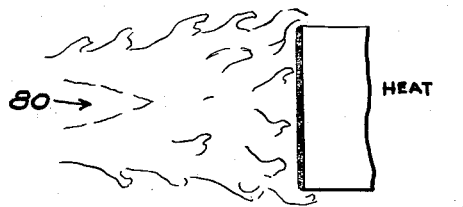
FIG. 1 is a composite generally diagrammatic view illustrating several steps in the method of this invention.

The process of preparing surface 30 (56, 61, 63) includes as a preferred step a shot blasting of surface 30 as represented at 65 in FIG. 1. Then the shot blasted surface is heated to approximately 200° F. This heating must be done under such conditions as to prevent any substantial formation of oxides on the shot blasted surface, and the surface must be protected from deposition of other foreign matter. This can be done by placing substrate 22 in an oven immediately after the shot blasting step and heating the entire substrate in a non-oxidizing atmosphere. Alternatively, surface 30 can be heated by a torch immediately after the shot blasting step as represented at 66 in FIG. 1.

Figure 4:
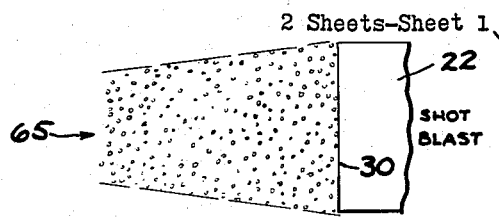
FIG. 4 is a side generally elevational view of a metallizing gun suitable for use in making hones according to this invention.
Figure 4:
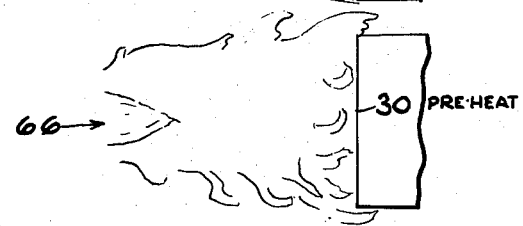
Figure 4:
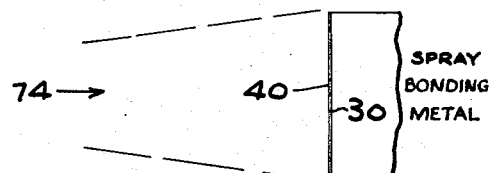
Figure 4:
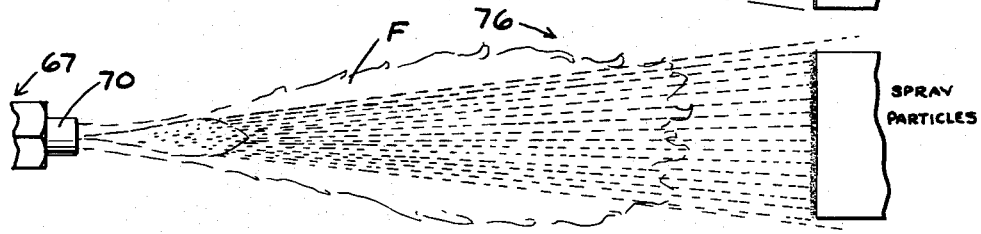
Figure 4:
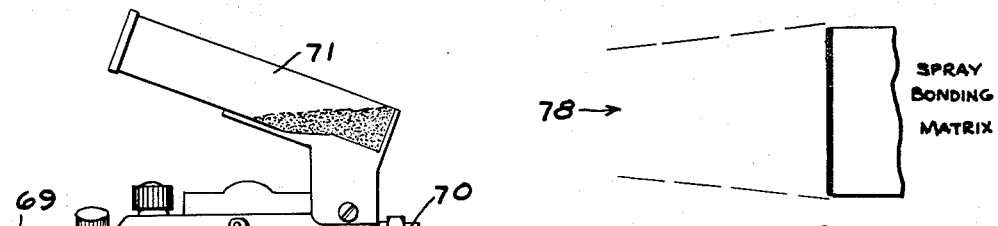
Figure 4:
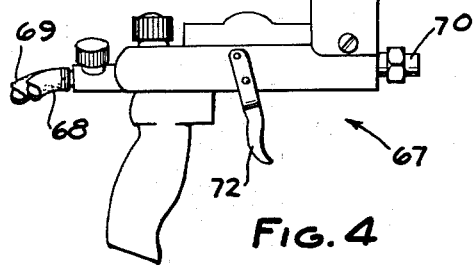

While surface 30 is in heated condition, the nickel-chromium-boron alloy in fused condition is applied over surface 30 to provide the bonding surface. This can be done by means of a conventional flame spray or metallizing gun 67 (FIG. 4). This gun includes lines 68 and 69 for gaseous fuel, a nozzle 70, a magazine 71 for particles of the nickel-chromium-boron alloy, and a trigger 72 for introducing the particles into the flame or stream of hot gases issuing from nozzle 70.

By this means, layer 40 is quickly applied as a thin flash layer over surfaces 30 as represented at 74 in FIG. 1. In practice, the layer is in the range of from about .001″ to about .005″ thick. The only requirements are that the layer be continuous and be thick enough to provide enough bonding material to bond both to surface 30 and the coatings of the abrasive grits later applied to the layer.

In the next step illustrated at 76, a body of grits 26 or 28 of the desired size together with a relatively small quantity of matrix material is flame sprayed onto layer 40. In some cases, all of the matrix material is provided in the form of a very thin coating of the matrix material on the individual grits. Such coated grits are available commercially. Very satisfactory hones have been made by the use of coated grits without the addition of any further matrix material in the flame spraying process. In other cases, uncoated grits may be used together with a quantity of particles of the matrix material in the flame spraying process.

For general purpose hones in which the grit sizes range from about 90 mesh to about 320 mesh, the preferred procedure is to use coated grits mixed with particles of the matrix material in the flame spraying step. To obtain best results, the grits and matrix particles should be screened so that they will have approximately the same size with the exception of a small quantity of fines. One reason for this is that if the matrix particles are substantially smaller than the grits, they separate from the body of grits, and it is very difficult if not impossible to obtain a homogeneous mixture of the grits and particles. The result is an uneven application of the grits and matrix on the substrate. Moreover, the particles of matrix should not be substantially larger than the grit particles since the matrix would then form blobs tending to fill up the spaces between grit columns and interfere with their cutting action.

It is essential that the volume of matrix particles be small as compared to the volume of grits. The reason for this is to insure against the matrix material filling up the spaces between the columns of grits so that the columns will be free to act as individual cutters. The relative volume of matrix particles and grits varies according to the size of the grits being used. With relatively coarse grits, for example, 90 mesh, the mixture of grits and matrix particles should contain a maximum of about 40 percent matrix particles by volume. With relatively fine grits, for example, 320 mesh, the mixture should contain a maximum of about 5 to 10 percent matrix particles by volume.

The probable reason for the variation in the ratio of matrix particles to grits is that in a column of coarse grits, relatively small portions of their surfaces are interengaged, and the voids between the grits in the column are relatively large. In contrast, the areas of interengagement between relatively fine grits are probably larger in proportion to their size while the inter-grit voids are relatively small. The fused matrix material penetrates the inter-grit voids, probably by capillarity, and more matrix is required to fill the voids between large grits than between small grits. Whether or not this is the correct explanation, the fact remains that best results are obtained by varying the quantity of matrix particles according to the size of the grits.

The grits or grit-matrix mixture is put into magazine 71 of metallizing gun 67 and is introduced into the flame F issuing from nozzle 70. The flame heats the matrix material to its fusion temperature without fusing the grits themselves. The grits and matrix become entrained in the hot gases and are propelled against the layer of bonding metal 40. The grits become deposited on the substrate in the columnar formation illustrated. The assembly is then cooled or allowed to cool and the resulting hone may then be brushed with a wire brush to clean it.

Where relatively coarse grits are being used, an ordinary oxyacetylene flame F can be employed in the metallizing process. However, it has been found that in flame spraying of relatively fine grits such as 300 mesh grits, the oxyacetylene flame is hot enough to soften the grits to an objectionable degree. Therefore, with fine grits, it is preferable to use hydrogen gas as a fuel rather than acetylene.

The above described steps comprise the preferred method of making hones according to this invention. However, the step of providing layer 40 of the bonding metal over the substrate can be omitted if considerable care is used in cleaning the substrate surface both before and after the shot blasting. In this case, the bonding surface would be the shot blasted surface itself rather than layer 40. It is believed that with very coarse grits, for example, grits coarser than 90 mesh, it may be preferable to employ two metallizing guns simultaneously, one to spray the grits and the other to spray the matrix material. These guns would be mounted side-by-side close together and their nozzles aimed so that their flames and entrained materials would merge before the grits strike the substrate.

In certain applications, a hone such as honing wheel 57 or 58 may be subjected to unusual forces. An example of this is a honing wheel used to cut rubber while rotating at speeds of about 10,000 s.f.p.m. At these speeds, centrifugal force tends to cast layer 40 of the bonding metal away from the substrate. To guard against this, after layer 40 of the bonding metal has been applied to the substrate, it is re-heated to its fusion temperature to improve the bond between layer 40 and the substrate. During this re-heating, the bonding metal shrinks in volume by about 20 percent, becomes more dense, and adheres more firmly to the substrate. The grits or grit-matrix mixture is then sprayed onto the densified bonding metal layer in the manner described.

In some situations, it may be desirable to flame spray the coated grits onto layer 40 without accompaniment of additional matrix material. As pointed out above, satisfactory hones have been made by this method. However, when such hones are to be subjected to unusual forces in a shear direction during the honing, it may be desirable to provide an additional quantity of matrix material to assist in keeping the grits anchored to layer 40. This may be done by flame spraying a thin layer of matrix material over the layer of grits. This layer, similar to layer 40, is a quick flash layer which may be about as thin as .001". This step is illustrated at 78 in FIG. 1.

The grit surface, with its overlayer, is then subjected to heat as represented at 80 in FIG. 1 to fuse the overlayer of matrix material with the matrix material previously provided and with layer 40. The added matrix material does not fill in spaces 34, 35 to any appreciable extent, but largely penetrates into the voids between the grits, probably by capillarity. The grit columns thus remain free to act as individual cutters.

This heating step must be done with considerable care not to overheat the layer of grits, since overheating causes the grit columns 26, 33 to collapse and form a relatively smooth surface which will not hone satisfactorily. As a general rule of thumb, coarse grit surfaces having, for example, 90 mesh grits, should be heated to a white heat for a very brief period. Where intermediate grits are used, for example, 140 mesh grits, the surface should be heated to a cherry red heat for a very brief period. Where fine grits are used, for example, 320 mesh grits, the surface should be heated only to a dull red heat for a very brief period. After the overlayer has been applied and fused, the assembly is finally cooled and may be brushed as mentioned above.

It is not known why the grits become deposited on the substrate in the form of a group of columns rather than in a layer of uniform thickness. However, it is theorized that when the grits are entrained in the flame spraying step, they may agglomerate or form clusters which are elongate in the direction of the gas stream. Thus, the actual body which becomes deposited on layer 40 is not an individual grit but a cluster of grits which already has the form of a column when it contacts layer 40.

The method of making gear hone 46 is identical to that described above for making hone stick 20 except that the gear is rotated with relation to the various devices which perform the shot blasting, heating, and flame spraying. The various steps are performed with the working devices suitably oriented with respect to the gear so that surfaces 56 on both sides of each gear will be presented to the working device. In a simple arrangement, the gear may be rotated successively in opposite directions relative to the working devices, and the working devices may be oriented at different angles for adequately coating teeth 48.

As pointed out above, top coating 52 of the grits will be relatively thick while the coating near the root of the tooth will be relatively thin because of the necessary orientation of the metallizing gun relative to the gear. However, the layer of grits 50 on the sides of the tooth are uniform in the critical working areas.

The method of making honing wheels 57 and 58 is identical to that described above for hone stick 20 except that, as in the case of gear 44, the substrate wheel 59, 60 is rotated with relation to the various devices which perform the shot blasting, heating, and flame spraying.

I claim:
1. Abrading tool structure comprising,
   a substantially rigid metal substrate, said substrate being provided with a layer of nickel-chromium-boron alloy serving as a bonding surface,
   myriad grits of an abrasive material selected from the group consisting of aluminum oxide, silicon carbide, titanium carbide, garnet and tungsten carbide,
   said grits being assembled in the form of a large number of columns,
   the grits of each column being bonded together by a matrix material comprising a nickel-chromium-boron alloy which extends between and is bonded to adjacent grits,
   each column having a base portion, said base portions being bonded to said bonding surface of said substrate by means of said matrix material so that said columns are anchored in a generally upright position relative to said substrate,
   said columns having upper portions which are spaced each from the other so that the columns form a large number of individual cutters,
   the spaces between said cutters being generally open and devoid of said matrix material.
2. The structure defined in claim 1 wherein said columns have a height of at least about .002".
3. The structure defined in claim 1 wherein said bonding surface of said substrate comprises a layer of bonding material of about .001" to about .005" thick on said substrate and said columns have a height in a range of about .015" to .020".
4. The structure defined in claim 1 wherein said substrate comprises a body of ferrous metal, the surface of said substrate being substantially free of oxides.

References Cited by the Examiner

UNITED STATES PATENTS

| | | | |
|---|---|---|---|
| 2,082,150 | 6/1937 | Coffman | 51—309 |
| 2,242,877 | 5/1941 | Albertson | 51—297 |
| 2,246,362 | 6/1941 | Kehoe | 51—309 |
| 2,277,520 | 3/1942 | Martin et al. | 51—293 |
| 2,562,587 | 7/1951 | Swearingen | 51—309 |
| 2,833,638 | 5/1958 | Owen | 51—309 |
| 2,877,105 | 3/1959 | Smith | 51—309 |
| 2,984,555 | 5/1961 | Curtis | 51—309 |

OTHER REFERENCES

"The Metco Flame Spraying Processes" (1960), Metco Inc., Bulletin 136B 30M–2/60, 13 pages.

ALEXANDER H. BRODMERKEL, *Primary Examiner.*

MORRIS LIEBMAN, *Examiner.*

D. J. ARNOLD, *Assistant Examiner.*